US009922235B2

(12) United States Patent
Cho et al.

(10) Patent No.: US 9,922,235 B2
(45) Date of Patent: Mar. 20, 2018

(54) AUTHENTICATING A USER THROUGH FINGERPRINT RECOGNITION

(71) Applicant: Samsung Electronics Co., Ltd., Gyeonggi-do (KR)

(72) Inventors: Jeong-Ho Cho, Gyeonggi-do (KR); Won Huh, Gyeonggi-do (KR); Jae-Yub Kim, Gyeonggi-do (KR); Ki-Hong Min, Seoul (KR); Jeong-Min Park, Gyeonggi-do (KR); Seung-Geol Baek, Gyeonggi-do (KR); Do-Hyoung Chung, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 13 days.

(21) Appl. No.: 15/004,317

(22) Filed: Jan. 22, 2016

(65) Prior Publication Data
US 2016/0224823 A1  Aug. 4, 2016

(30) Foreign Application Priority Data

Jan. 29, 2015  (KR) .................. 10-2015-0014551

(51) Int. Cl.
*G06K 9/00* (2006.01)

(52) U.S. Cl.
CPC ..... *G06K 9/00087* (2013.01); *G06K 9/00026* (2013.01); *G06K 9/00067* (2013.01); *G06K 9/00107* (2013.01)

(58) Field of Classification Search
CPC ............ G06F 21/31; G06K 9/00067; G06K 9/00026; G06K 9/00087; G06K 9/00107
See application file for complete search history.

(56) References Cited

U.S. PATENT DOCUMENTS

| 5,077,803 | A   | * | 12/1991 | Kato ............... A61B 5/1172 356/71 |
| 6,647,133 | B1  |   | 11/2003 | Morita et al. |
| 9,195,879 | B1  | * | 11/2015 | Du .................... G06K 9/00067 |

(Continued)

FOREIGN PATENT DOCUMENTS

| EP | 2 166 473 A2  | 3/2010 |
| JP | 2002-279413 A | 9/2002 |

(Continued)

OTHER PUBLICATIONS

International Search Report dated May 2, 2016.
European Search Report dated Jun. 3, 2016.

*Primary Examiner* — Stephen R Koziol
*Assistant Examiner* — Shaghayegh Azima
(74) *Attorney, Agent, or Firm* — Cha & Reiter, LLC

(57) ABSTRACT

Provided is a method for authenticating a user in an electronic device. In illustrative embodiments, a fingerprint input from the user is be detected by receiving detection signals for respective sample points across an area of the fingerprint input. A determination value may be computed, which represents a degree of distribution of the detection signals according to signal strengths. It is then determined whether the determination value falls outside a preset reference range. If the determination value falls outside the preset reference range, the method determines that the fingerprint input from the user is invalid.

15 Claims, 8 Drawing Sheets

(56) References Cited

U.S. PATENT DOCUMENTS

| | | | |
|---|---|---|---|
| 9,455,985 B2* | 9/2016 | Lee | H04W 12/04 |
| 2006/0120578 A1* | 6/2006 | Shatford | G06K 9/00093 |
| | | | 382/125 |
| 2007/0014443 A1* | 1/2007 | Russo | G06K 9/00114 |
| | | | 382/124 |
| 2008/0176583 A1* | 7/2008 | Brachet | G01S 5/0236 |
| | | | 455/456.3 |
| 2008/0253625 A1 | 10/2008 | Schuckers et al. | |
| 2011/0215150 A1* | 9/2011 | Schneider | G06K 9/0002 |
| | | | 235/439 |
| 2014/0153791 A1 | 6/2014 | Kim et al. | |
| 2015/0198699 A1* | 7/2015 | Kuo | G01S 7/52017 |
| | | | 367/7 |
| 2016/0019408 A1* | 1/2016 | Liu | G06K 9/0002 |
| | | | 382/124 |

FOREIGN PATENT DOCUMENTS

| | | | |
|---|---|---|---|
| KR | 10-2011-0014758 | * | 2/2011 |
| KR | 10-2011-0014758 A | | 2/2011 |
| KR | 10-1385929 B1 | | 4/2014 |

* cited by examiner

AUTHENTICATING A USER THROUGH FINGERPRINT RECOGNITION

CLAIM OF PRIORITY

This application claims the benefit under 35 U.S.C. § 119(a) of a Korean patent application filed in the Korean Intellectual Property Office on Jan. 29, 2015 and assigned Serial No. 10-2015-0014551, the entire disclosure of which is incorporated herein by reference.

TECHNICAL FIELD

The present disclosure relates to a method and electronic device for authenticating a user through fingerprint recognition.

BACKGROUND

Commercialized portable terminals have recently added user authentication capability through fingerprint recognition. A user inputs a fingerprint by bringing his or her finger into contact with a fingerprint sensor provided in the portable terminal. The portable terminal receives the user's fingerprint input by scanning the user's finger contacting the surface of the fingerprint sensor.

SUMMARY

However, as devices capable of performing fingerprint recognition have become more widespread, attempts to hack such devices have increased. Moreover, a fingerprint may be forged by using a fingerprint left on glass or the like.

The above information is presented as background information only to assist with an understanding of the present disclosure. No determination has been made, and no assertion is made, as to whether any of the above might be applicable as prior art with regard to the present disclosure.

An aspect of the present disclosure is to address at least the above-mentioned problems and/or disadvantages and to provide at least the advantages described below. Accordingly, an aspect of the present disclosure is to provide a method and electronic device for authenticating a user through security-reinforced fingerprint recognition.

In accordance with an aspect of the present disclosure, there is provided a method for authenticating a user using fingerprint recognition in an electronic device. The method includes detecting a fingerprint input from the user by receiving detection signals for respective sample points across an area of the fingerprint input; computing a determination value representing a degree of distribution of the detection signals according to signal strengths; determining whether the determination value falls outside a preset reference range; and determining that the fingerprint input from the user is invalid, if the determination value falls outside the preset reference range.

In accordance with another aspect of the present disclosure, there is provided an electronic device for authenticating a user using fingerprint recognition. The electronic device includes a fingerprint recognition module configured to detect a fingerprint input from the user by receiving detection signals for respective sample points across an area of the fingerprint input; and a processor configured to: compute a determination value representing a degree of distribution of the detection signals according to signal strengths; determine whether the determination value falls outside a preset reference range, and determine that the fingerprint input from the user is invalid, if the determination value falls outside the preset reference range.

In accordance with another aspect, an electronic device for authenticating a user using fingerprint recognition includes a fingerprint recognition module configured to detect a fingerprint input from the user and to determine a signal-level-specific distribution of signal strengths of detection signals corresponding to the fingerprint input; and a processor configured to: compute a determination value by analyzing the signal-level-specific distribution, determine whether the determination value falls within a preset reference range, and determine that the fingerprint input from the user is valid, if the determination value falls within the preset reference range.

In according with another aspect, a non-transitory computer-readable recording medium storing instructions, that when executed by a processor, cause an electronic device to perform a method for authenticating a user using fingerprint recognition in an electronic device is provided. The method includes detecting a fingerprint input from the user by receiving detection signals for respective sample points across an area of the fingerprint input; computing a determination value representing a degree of distribution of the detection signals according to signal strengths; determining whether the determination value falls outside a preset reference range; and determining that the fingerprint input from the user is invalid, if the determination value falls outside the preset reference range.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
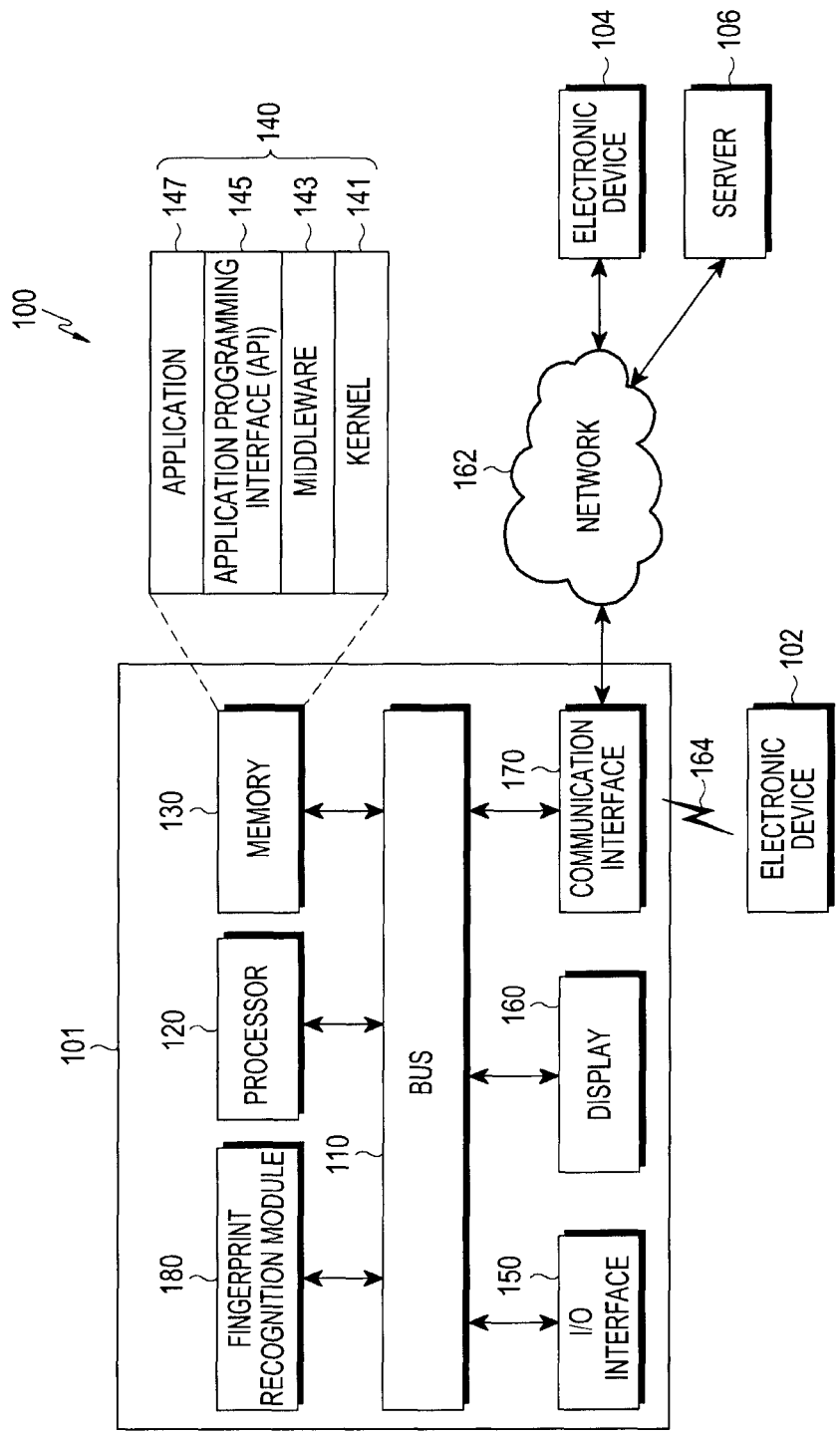
FIG. 1 illustrates a network environment including an electronic device according to various embodiments of the present disclosure.

The following description with reference to the accompanying drawings is provided to assist in a comprehensive understanding of exemplary embodiments of the disclosure as defined by the claims and their equivalents. The description includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure will be described herein below with reference to the accompanying drawings. Although specific embodiments of the present disclosure are illustrated in the drawings and relevant detailed descriptions are provided, various changes can be made to the exemplary embodiments and various exemplary embodiments may be provided. Accordingly, the various exemplary embodiments of the present disclosure are not limited to the specific embodiments and should be construed as including all changes and/or equivalents or substitutes included in the ideas and technological scopes of the exemplary embodiments of the present disclosure. In the explanation of the drawings, similar reference numerals are used for similar elements.

The term "include" or "may include" used in the exemplary embodiments of the present disclosure indicates the presence of disclosed corresponding functions, operations, elements, or the like, and does not limit additional one or more functions, operations, elements, or the like. In addition, it should be understood that the term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

The term "or" or "at least one of A or/and B" used in the various exemplary embodiments of the present disclosure includes any and all combinations of the associated listed items. For example, the term "A or B" or "at least one of A or/and B" may include A, B, or all of A and B.

Although the terms such as "first" and "second" used in the various exemplary embodiments of the present disclosure may modify various elements of the various exemplary embodiments, these terms do not limit the corresponding elements. For example, these terms do not limit an order and/or importance of the corresponding elements. These terms may be used for the purpose of distinguishing one element from another element. For example, a first user device and a second user device all indicate user devices or may indicate different user devices. For example, a first element may be named as a second element without departing from the right scope of the various exemplary embodiments of the present disclosure, and similarly, a second element may be named as a first element.

It will be understood that when an element is "connected" or "coupled" to another element, the element may be directly connected or coupled to the other element, and there may be another new element between the element and the another element. To the contrary, it will be understood that when an element is "directly connected" or "directly coupled" to another element, there is no other element between the element and the another element.

The terms used in the various exemplary embodiments of the present disclosure are for the purpose of describing particular exemplary embodiments only and are not intended to be limiting. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various exemplary embodiments.

An electronic device according to various embodiments of the present disclosure may be a device including a fingerprint function or a communication function. For example, the electronic device may be a combination of one or more of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, mobile medical equipment, an electronic bracelet, an electronic necklace, an electronic appcessory, a camera, a wearable device (for example, a Head-Mounted Device (HMD) such as electronic glasses), an electronic cloth, an electronic bracelet, an electronic necklace, an electronic appcessory, an electronic tattoo, and a smart watch.

According to some embodiments, the electronic device may be a smart home appliance having a fingerprint function or a communication function. The electronic device may include, for example, a Television (TV), a Digital Video Disk (DVD) player, audio equipment, a refrigerator, an air conditioner, a vacuum cleaner, an oven, a microwave oven, a laundry machine, an air cleaner, a set-top box, a TV box (for example, HomeSync™ of Samsung, TV™ of Apple, or TV™ of Google), a game console, an electronic dictionary, an electronic key, a camcorder, and an electronic frame.

According to some embodiments, the electronic device may include at least one of various medical equipment (for example, Magnetic Resonance Angiography (MRA), Magnetic Resonance Imaging (MRI), Computed Tomography (CT), an imaging device, or an ultrasonic device), a navigation system, a Global Positioning System (GPS) receiver, an Event Data Recorder (EDR), a Flight Data Recorder (FDR), a vehicle infotainment device, electronic equipment for ships (for example, navigation system and gyro compass for ships), avionics, a security device, a vehicle head unit, an industrial or home robot, an Automatic Teller's Machine (ATM), and a Point of Sales (POS).

According to some embodiments, the electronic device may include a part of a furniture or building/structure having a fingerprint recognition function or a communication function, an electronic board, an electronic signature receiving device, a projector, and various measuring instruments (for example, a water, electricity, gas, or electric wave measuring device). The electronic device according to various embodiments of the present disclosure may be one of the above-listed devices or a combination thereof. The electronic device according to various embodiments of the present disclosure may be a flexible device. It will be obvious to those of ordinary skill in the art that the electronic device according to various embodiments of the present disclosure is not limited to the above-listed devices.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device (for example, an artificial intelligence electronic device).

FIG. 1 illustrates a block diagram of an electronic device 101 according to an embodiment, operating in a network environment 100. The electronic device 101 may include a bus 110, a processor 120, a memory 130, an Input/Output (I/O) interface 150, a display 160, a communication interface 170, and a fingerprint recognition module 180. In other embodiments, electronic device 101 may omit at least one of the foregoing elements or may further include other elements.

The bus 110 may include a circuit for interconnecting the elements 120 through 180 described above and for allowing communication (for example, a control message and/or data) between the elements 110 through 180.

The processor 120 may include one or more of a Central Processing Unit (CPU), an Application Processor (AP), and a Communication Processor (CP). The processor 120 performs operations or data processing for control and/or communication of, for example, at least one other element of the electronic device 101.

According to an embodiment of the present disclosure, the processor 120 determines whether a fingerprint input through the fingerprint recognition module 180 is valid. Herein, a fingerprint input of a user is said to be "valid" when the input fingerprint is detected as a fingerprint of that user previously registered in the electronic device 101. The processor 120 may also determine whether the input fingerprint is forged, and whether the input fingerprint is input by a living organism. If the fingerprint input through the fingerprint recognition module 180 is valid, the processor 120 performs authentication with respect to the user by determining the user having input the fingerprint as a proper user.

The processor 120 analyzes a fingerprint image generated by the fingerprint recognition module 180. The processor 120 may express a detected change in a capacitance, generated during user's input of the fingerprint to the fingerprint recognition module 180, as a level value. For example, the surface of a fingerprint sensor over which a user places his or her finger may be a surface of pixels, where a change in capacitance in a circuit due to contact with the user's finger is individually detected for each pixel. The processor 120 may express a capacitance change of each of the pixels distributed over the whole region occupied by the fingerprint, as a level value for the fingerprint sensed by the fingerprint recognition module 180.

A level value expressing the capacitance change may be referred to herein as a "signal level". The signal level may be expressed with sixteen values if the fingerprint image is a grayscale image of sixteen shades of gray. For example, the processor 120 may determine a capacitance change as one of 0-240 units and determine a signal level corresponding to the capacitance change. The processor 120 may calculate a variance indicating the distribution of signal levels for the fingerprint, an accumulation of a number of data samples from low to high levels in a signal-level-based histogram, an average of the signal levels, a standard deviation of the signal levels, and the like.

The processor 120 determines, by using the accumulation of the number of data samples, a "determination value" for determining whether the fingerprint input to the fingerprint recognition module 180 is invalid. For example, the processor 120 may calculate a difference between a signal level value corresponding to 90% of an accumulation of the distribution and a signal level value corresponding to 10% of the accumulation of the distribution as the determination value for determining whether the fingerprint is invalid. (This is explained in detail later in reference to the graphs of FIGS. 5-7.) The determination value may also be used to determine, in conjunction with an image similarity analysis of the fingerprint image, whether the fingerprint input is valid. That is, in one embodiment, if both the fingerprint image substantially matches a pre-stored image based on a certain criteria, and the determination value is within the preset range, then the fingerprint input may be determined to be valid. However, in another embodiment, just the determination value may be used to determine whether a fingerprint input is valid, without any similarity analysis.

As just mentioned, the processor 120 may determine based on the determination value whether the fingerprint input to the fingerprint recognition module 180 is invalid. The processor 120 may determine that the input fingerprint is valid, if the determination value falls within a preset reference range and the fingerprint image substantially matches a previously stored image for that user. The memory 130 may include a volatile and/or nonvolatile memory. The memory 130 may store, for example, commands or data associated with at least one other elements of the electronic device 101. According to an embodiment of the present disclosure, the memory 130 may include one or more fingerprint images generated by the fingerprint recognition module 180.

The memory 130 may store software and/or a program 140. The program 140 may include, for example, a kernel 141, middleware 143, an Application Programming Interface (API) 145, and/or an application program (or an application) 147. At least some of the kernel 141, the middleware 143, and the API 145 may be referred to as an Operating System (OS).

The kernel 141 controls or manages, for example, system resources (for example, the bus 110, the processor 120, or the memory 130) used to execute an operation or a function implemented in other programs (for example, the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In regard to task requests received from the application program 147, the middleware 143 performs control (for example, scheduling or load balancing) with respect to the task requests, for example, by giving priorities for using a system resource (for example, the bus 110, the processor 120, or the memory 130) of the electronic device 101 to at least one of the application programs 147.

The API 145 is an interface used for the application 147 to control a function provided by the kernel 141 or the middleware 143, and may include, for example, at least one interface or function (for example, a command) for file control, window control, image processing or character control.

The I/O interface 150 serves as an interface for delivering a command or data input from a user or another external device to other component(s) 110 through 140 and 160 through 180 of the electronic device 101. The I/O interface 150 may also output a command or data received from other component(s) 110 through 140 and 160 through 180 of the electronic device 101 to a user or another external device.

According to an embodiment of the present disclosure, the I/O interface 150 may receive a user input for inputting a fingerprint from the user. The I/O interface 150 may also receive a user input for requesting determination of whether a fingerprint input to the fingerprint recognition module 180 is forged or not.

The display 160 may include, for example, a Liquid Crystal Display (LCD), a Light Emitting Diode (LED) display, an Organic Light Emitting Diode (OLED) display, a MicroElectroMechanical System (MEMS) display, or an electronic paper display. The display 160 may display various contents (for example, a text, an image, video, an icon, or a symbol) to users. The display 16 may include a touch screen, and receives a touch, a gesture, proximity, or a hovering input, for example, by using an electronic pen or a part of a body of a user.

According to an embodiment of the present disclosure, the display 160 may be implemented to include the fingerprint recognition module 180 to receive a fingerprint from the user.

The communication interface 170 sets up communication, for example, between the electronic device 101 and an external device (for example, a first external electronic device 102, a second external electronic device 104, or a server 106). For example, the communication interface 170 is connected to a network 162 through wireless or wired communication to communicate with the external device (for example, the second external electronic device 104 or the server 106).

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). The wired communication may include, for example, at least one of a USB (universal serial bus), a High Definition Multimedia Interface (HDMI), a Recommended Standard (RS)-232, and a Plain Old Telephone Service (POTS). The network 21 may include a telecommunications network, for example, at least one of a computer network (for example, a Local Area Network (LAN) or a Wide Area Network (WAN)), Internet, and a telephone network.

Each of the first external electronic device 102 and the second external electronic device 104 may be a device of the same type as or a different type than the electronic device 101. According to an embodiment of the present disclosure, the server 106 may include a group of one or more servers.

The fingerprint recognition module 180 may include a fingerprint sensor (not shown) to receive a fingerprint input from a user. Once the surface of a user's finger contacts the fingerprint sensor, the fingerprint recognition module 180 scans the finger surface and generates a fingerprint image by using the scanned fingerprint, thus acquiring the fingerprint of the user. To this end, the fingerprint recognition module 180 may include a fingerprint scanner. In the following description, an image generated by scanning a user's fingerprint will be referred to as a "fingerprint image".

As one example, the fingerprint recognition module 180 may generate a 16-color grayscale image as the fingerprint image. In an example, a frequency of a signal (hereinafter, referred to as a "scan signal") that the fingerprint recognition module 180 generates to scan the user's fingerprint may be 20 MHz. In another example, the fingerprint recognition module 180 may generate signals of at least two frequency bands (for example, a signal of 2 KHz and a signal of 2 MHz) to scan the user's fingerprint. The fingerprint recognition module 180 may express a capacitance change generated during the user's fingerprint input as a level value and generate the fingerprint image expressing the distribution of varying level values.

The scan signal output by the fingerprint sensor of the fingerprint recognition module 180 is changed by a ridge or valley of the user's finger and is detected by the fingerprint recognition module 180. The scan signal may be changed by the ridge or valley of the finger. The fingerprint recognition module 180 may detect the changed signals by the ridge or the valley of the finger, and may measure a signal strength of the detected signals (hereinafter, referred to as a "detection signal").

For example, the fingerprint recognition module 180 may express the signal strength of the detection signals as one of 0-240. The fingerprint recognition module 180 may classify each detection signal as falling within a signal strength range. In an example, a classified signal level of each detection signal may be obtained by determining signal strengths of 1-15 as a first level, 16-30 as a second level, 31-45 as a third level, 46-60 as a fourth level, 61-75 as a fifth level, 76-90 as a sixth level, 91-105 as a seventh level, 106-120 as an eighth level, 121-135 as a ninth level, 136-150 as a tenth level, 151-165 as an eleventh level, 166-180 as a twelfth level, 181-195 as a thirteenth level, 196-210 as a fourteenth level, 210-225 as a fifteenth level, and 226-240 as a sixteenth level. Hereafter, a signal level range such as any of the 16 ranges denoted above will be referred to as just a "signal level". The fingerprint image may express a signal level of the detection signal with a color or gray shade corresponding to the signal level. The fingerprint recognition module 180 may generate, for example, a fingerprint image expressed in sixteen colors or shades corresponding to the first through sixteenth levels.

The fingerprint recognition module 180 may count the number of detection signals corresponding to each signal level. For example, suppose that signal strengths of detection signals range over first through sixteenth levels. The fingerprint recognition module 180 may count the respective number of detection signals corresponding to each of the sixteen levels, i.e., a first number of detection signals corresponding to the first level, a second number of detection signals corresponding to the second level, etc., to a sixteenth number of detection signals corresponding to the sixteenth level.

The fingerprint recognition module 180 may also express the number of detection signals corresponding to each signal level, that is, the signal-level-specific distribution of detection signals, as a histogram type graph. The signal-level-specific distribution of the detection signals may be expressed as an image. The fingerprint recognition module 180 outputs scan signals toward the user's finger contacting the surface of the display 160 or the surface of the fingerprint sensor, detects detection signals, and analyzes the signal-level-specific distribution of the detection signals to generate a fingerprint image. The operations of outputting the scan signals, detecting the detection signals, and analyzing the signal-level-specific distribution of the detection signals may correspond to an operation of scanning a fingerprint input from the user.

The processor 120 may determine, by using the signal-level-specific distribution of the detection signals, that is, which indicates how the detection signals are spread over a range of signal levels, whether the fingerprint input from the user is valid, for example, whether the input fingerprint is forged or the input fingerprint is input by a living organism. The processor 120 may calculate a histogram or variance indicating the signal-level-specific distribution of a fingerprint input from the user, an accumulation of a number of data samples representing measured levels from a low signal level to a high signal level, the variance, a signal-strength average of detection signals, a standard deviation, and the like.

The processor 120 may determine, by using the accumulation of the number of data samples from the low level to the high level, a determination value for determining whether the fingerprint input from the user is invalid (or valid in conjunction with the above-noted image similarity analysis). For example, the processor 120 may determine a difference between a value corresponding to 90% of an accumulation of the data samples and a value corresponding to 10% of the accumulation of the data samples as the determination value for determining whether the fingerprint is invalid or valid. The percentage values such as the exemplary 10% and 90% used for computing the determination value may be determined at random by the processor 120 or may be a value stored in advance in the memory 130 or input by the user.

The processor 120 may determine, based on the determination value, whether the fingerprint input from the user is invalid. The processor 120 may determine that the input fingerprint is valid, if the determination value falls within a preset reference range and a similarity analysis of the image indicates a match. On the other hand, if the determination value falls beyond the preset reference range, the processor 120 may determine that the input fingerprint is invalid, even if the similarity analysis is indicative of a match.

For example, the processor 120 may determine that the input fingerprint is not forged, if the determination value falls within the preset reference range. On the other hand, if the determination value falls beyond the preset reference range, the processor 120 may determine that the input fingerprint is forged. For example, the processor 120 may determine that authentication with respect to the user having input the fingerprint succeeds, if the determination value falls within the preset reference range. On the other hand, if the determination value falls outside the preset reference range, the processor 120 may determine that authentication with respect to the user having input the fingerprint fails. For example, the processor 120 may determine that the fingerprint is input by a living organism, if the determination value falls within the preset reference range. On the other hand, if the determination value falls outside the preset reference range, the processor 120 may determine that the fingerprint is input by a non-living organism (for example, a dead body, a cut body part, rubber, plastics, or the like).

According to an embodiment, the fingerprint recognition module 180 may be implemented as a part of the I/O interface 150 or the display 160. According to another embodiment, the fingerprint recognition module 180 may be implemented to be included in the processor 120.

According to various embodiments, some or all of the operations performed by the electronic device 101 may be performed in another one or more electronic devices (for example, the electronic devices 102 and 104 or the server 106). According to an embodiment, when the electronic device 101 has to perform a function or a service automatically or at a request, the electronic device 101 may request another device (for example, the electronic device 102 or 104 or the server 106) to execute at least some functions associated with the function or the service, in place of or in addition to executing the function or the service. The other electronic device (for example, the electronic device 102 or 104 or the server 106) may execute the requested function or additional function and deliver the execution result to the electronic device 101. The electronic device 101 may then process or further process the received result to provide the requested function or service. To this end, for example, cloud computing, distributed computing, or client-server computing may be used.

In accordance with another aspect of the present disclosure, there is provided an electronic device for authenticating a user using fingerprint recognition. The electronic device includes a fingerprint recognition module configured to detect a fingerprint input from the user by receiving detection signals for respective sample points across an area of the fingerprint input; and a processor configured to: compute a determination value representing a degree of distribution of the detection signals according to signal strengths; determine whether the determination value falls outside a preset reference range, and determine that the fingerprint input from the user is invalid, if the determination value falls outside the preset reference range.

In accordance with another aspect, an electronic device for authenticating a user using fingerprint recognition includes a fingerprint recognition module configured to detect a fingerprint input from the user and to determine a signal-level-specific distribution of signal strengths of detection signals corresponding to the fingerprint input; and a processor configured to: compute a determination value by analyzing the signal-level-specific distribution, determine whether the determination value falls within a preset reference range, and determine that the fingerprint input from the user is valid, if the determination value falls within the preset reference range.

Figure 2:
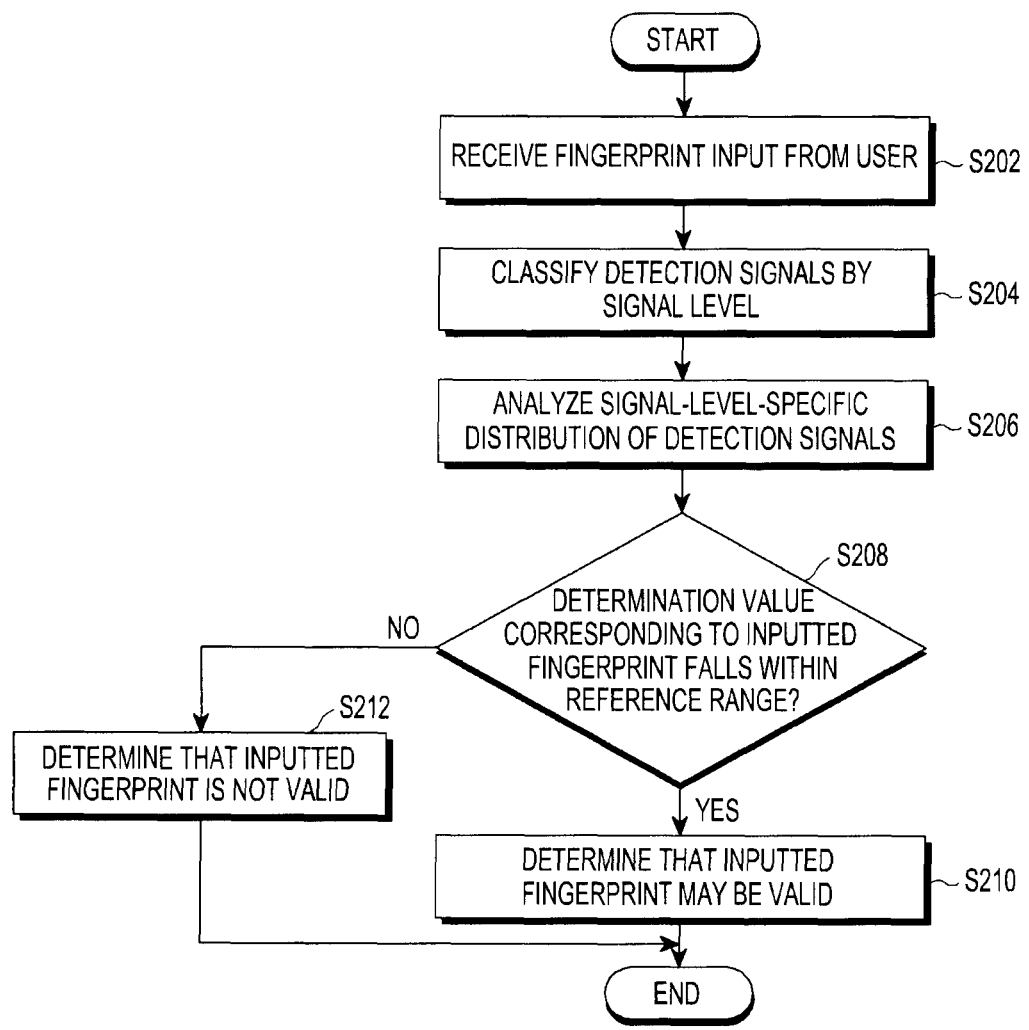
FIG. 2 is a flowchart illustrating a method for authenticating, by an electronic device, a user through fingerprint recognition according to various embodiments of the present disclosure.

FIG. 2 is a flowchart illustrating a method for authenticating, by an electronic device (for example, the electronic device 101), a user through fingerprint recognition according to various embodiments of the present disclosure. As shown in FIG. 2, the fingerprint recognition module 180 of the electronic device 101 receives a fingerprint input from a user in operation S202. In operation S202, the user brings the surface of a finger into contact with the surface of the display 160 or the surface of the fingerprint sensor included in the fingerprint recognition module 180, thus inputting the fingerprint into the electronic device 101. Once the user's finger is sensed on the display 160 or the fingerprint sensor, the fingerprint recognition module 180 outputs scan signals toward the finger to scan the finger's surface. The display 160 or the fingerprint sensor detects signals changed by the finger's surface, that is, detection signals. The fingerprint recognition module 180 classifies the detection signals by signal level in operation S204. For example, the fingerprint recognition module 180 may count the number of detection signals corresponding to each signal level.

The fingerprint recognition module 180 analyzes a signal-level-specific distribution of the detection signals in operation S206. As explained further below in connection with FIGS. 5-7, the processor 120 calculates an accumulation of the number of signal-level-specific data samples of the detection signals, and determines, by using the accumulation, a determination value for determining whether the fingerprint input in operation S202 is valid. Although not shown in FIG. 2, according to an embodiment of the present disclosure, the fingerprint recognition module 180 may generate an image expressing the user's fingerprint input in operation S202, that is, a fingerprint image, by using the signal-level-specific data of the detection signals.

The processor 120 determines whether the determination value corresponding to the input fingerprint falls within the preset reference range in operation S208. If determining in operation S208 that the determination value falls within the preset reference range (Yes in operation S208), the processor 120 determines that the input fingerprint may be valid in operation S210. In one embodiment, the input fingerprint would be determined valid with this operation if the fingerprint image also matches a pre-stored image for the particular user. In an alternative embodiment, the input fingerprint is determined valid just based on the determination value, without an image matching analysis. In either of these embodiments, if determining in operation S208 that the determination value falls outside the preset reference range (No in operation S208), the processor 120 determines that the input fingerprint is not valid in operation S212.

Figure 3:
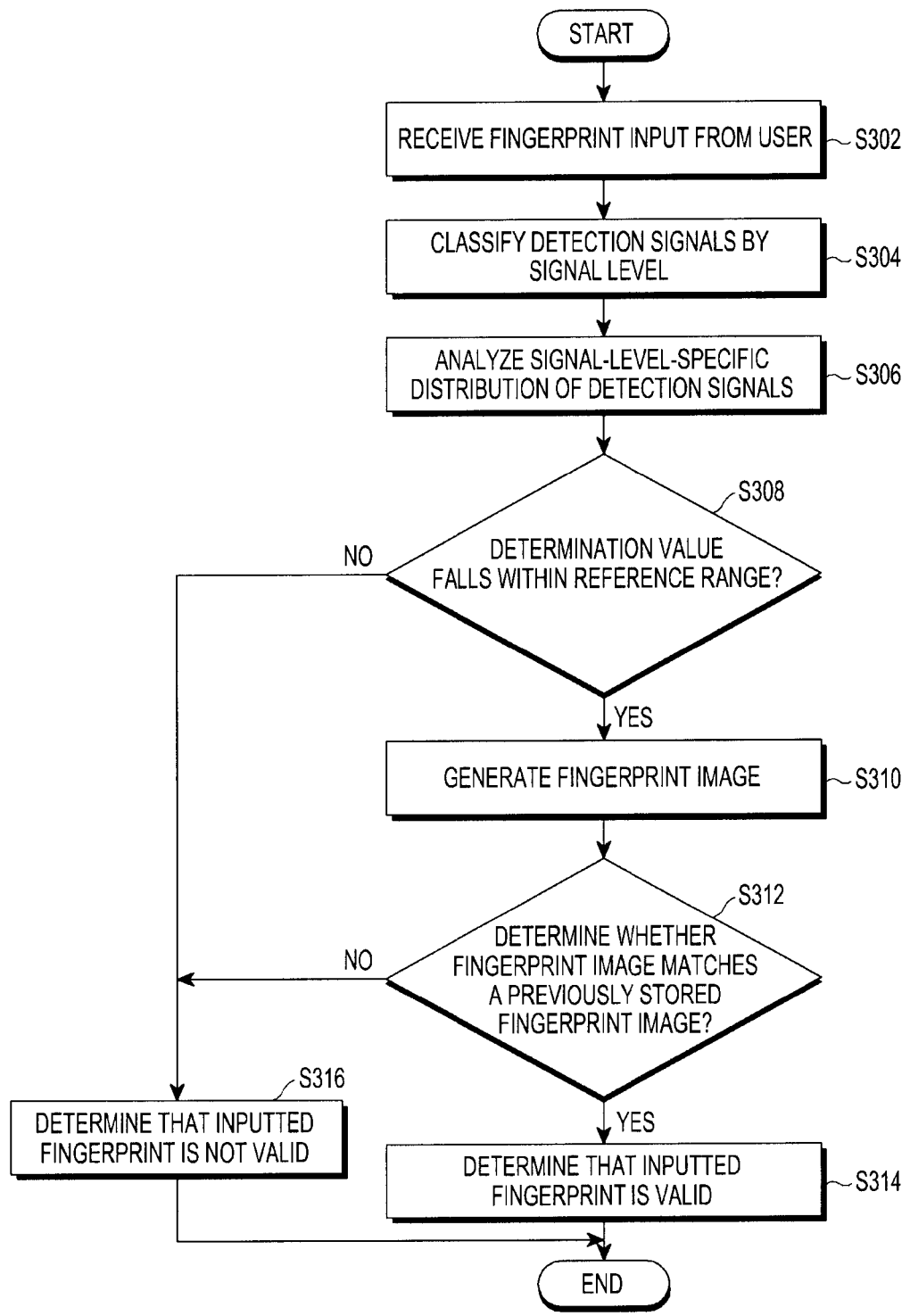
FIG. 3 is a flowchart illustrating a method for authenticating, by an electronic device, a user through fingerprint recognition according to various embodiments of the present disclosure.

FIG. 3 is a flowchart illustrating a method for authenticating, by an electronic device (for example, the electronic device 101), a user through fingerprint recognition according to various embodiments of the present disclosure. As shown in FIG. 3, the fingerprint recognition module 180 of the electronic device 101 receives a fingerprint input from the user in operation S302. In operation S302, the user brings the surface of his/her finger into contact with the surface of the display 160 or the surface of the fingerprint sensor included in the fingerprint recognition module 180 to input the fingerprint into the electronic device 101. Once the user's finger is sensed on the display 160 or the fingerprint sensor, the fingerprint recognition module 180 outputs scan signals toward the finger to scan the finger's surface. The display 160 or the fingerprint sensor detects signals changed by the finger's surface, that is, detection signals. The fingerprint recognition module 180 classifies the detection signals by signal level in operation S304. For example, the fingerprint recognition module 180 may count the number of detection signals corresponding to each signal level. The detection signal may be detected for each pixel on the entire region occupied by the fingerprint, and for each pixel, the fingerprint recognition module 180 may express a capacitance change as a signal level.

The fingerprint recognition module 180 analyzes a signal-level-specific distribution of the detection signals in operation S306. The processor 120 calculates an accumulation of the signal-level-specific data samples of the detection signals, and determines, by using the accumulation of the number of signal-level-specific data samples, whether the fingerprint input in operation S302 is invalid.

The processor 120 determines whether the determination value corresponding to the input fingerprint falls within a preset reference range in operation S308. If determining that the determination values falls outside the preset reference range in operation S308 (No in operation S308), the processor 120 determines that the fingerprint is invalid in operation S316.

If determining that the determination values falls within the preset reference range in operation S308 (Yes in operation S308), the processor 120 controls the fingerprint recognition module 180 to generate a fingerprint image in operation S310. According to an embodiment, the fingerprint recognition module 180 generates the fingerprint image by using a signal strength of each of the detection signals.

The processor 120 determines whether the fingerprint image generated in operation S310 matches a previously stored fingerprint image in operation S312. If determining that the generated fingerprint image does not match the previously stored fingerprint image in operation S312 (No in operation S312), the processor 120 determines that the fingerprint input in operation S302 is invalid in operation S316. If determining that the generated fingerprint image matches the previously stored fingerprint image in operation S312 (Yes in operation S312), the processor 120 determines that the input fingerprint is valid in operation S314.

According to an embodiment, if determining that the fingerprint input in operation S302 is valid in operation S314, the processor 120 displays, through the display 160, a notification indicating that authentication with respect to the user having input the fingerprint succeeds. If determining that the fingerprint input in operation S302 is not valid in operation S316, the processor 120 displays, through the display 160, a notification indicating that authentication with respect to the user having input the fingerprint fails.

According to an embodiment, the processor 120 may determine that the user having input the fingerprint in operation S302 is identical to a user corresponding to the previously stored fingerprint image, that is, a user previously registered in the electronic device 101, if a similarity between the fingerprint image generated in operation S308 and the previously stored fingerprint image is higher than a preset reference rate (for example, 70% or the like).

In FIG. 3, it has been described that the electronic device 101 determines whether the determination value determined based on the signal-level-specific distribution of the detection signals falls within the preset reference range, generates the fingerprint image, and determines whether the generated fingerprint image is identical to the previously stored fingerprint image. However, according to another embodiment of the present disclosure, the electronic device 101 may first determine whether the generated fingerprint image is identical to the previously stored fingerprint image and then determine whether the determination value determined based on the signal-level-specific variance of the detection signals falls within the preset reference range.

According to an embodiment, a distribution of the detection signals may be analyzed simultaneously with generation of the fingerprint image. The processor 120 may compare the generated fingerprint image with the fingerprint image previously stored in the memory 130 to determine whether these two fingerprint images are identical and at the same time, determine whether the determination value for the detection signals falls within the preset reference range. The processor 120 of the electronic device 101 may determine that the input fingerprint is valid, if two conditions are satisfied at the same time, that is, if the generated fingerprint image and the previously stored fingerprint image are identical to each other and at the same time, the determination value for the detection signals falls within the reference range.

In accordance with an aspect of the present disclosure, there is provided a method for authenticating a user using fingerprint recognition in an electronic device. The method includes detecting a fingerprint input from the user by receiving detection signals for respective sample points across an area of the fingerprint input; computing a determination value representing a degree of distribution of the detection signals according to signal strengths; determining whether the determination value falls outside a preset reference range; and determining that the fingerprint input from the user is invalid, if the determination value falls outside the preset reference range.

Figure 4A:
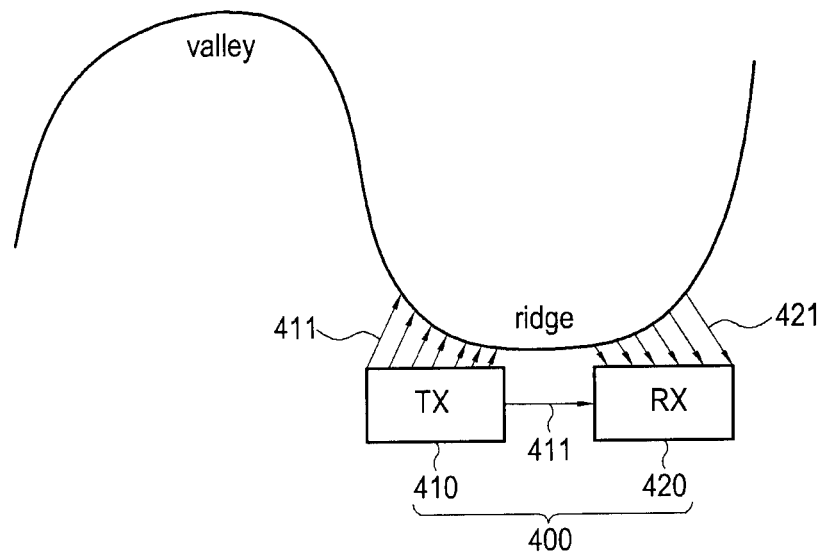
FIG. 4A and FIG. 4B illustrate a scheme in which a fingerprint is sensed by an electronic device according to various embodiments of the present disclosure.
Figure 4B:
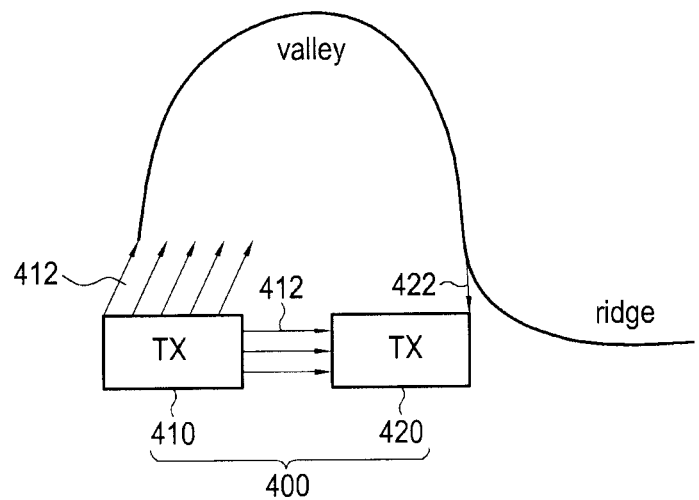

FIGS. 4A and 4B illustrate a scheme by which a fingerprint is sensed by an electronic device (for example, the electronic device 101) according to various embodiments of the present disclosure. FIG. 4A illustrates fingerprint recognition in a ridge of a fingerprint, and FIG. 4B illustrates fingerprint recognition in a valley of the fingerprint.

Generally, a fingerprint may include ridges and valleys. A fingerprint sensor 400 included in the fingerprint recognition module 180 may include a transmitter 410 that generates scan signals 411 and 412 for recognizing a fingerprint, and a receiver 420. The transmitter 410 transmits the scan signals 411 and 412 toward the fingerprint to identify the ridges or valleys of the fingerprint, and the receiver 420 receives the scan signals 411 and 412 changed by the fingerprint, that is, detection signals 421 and 422. An electric field may be generated via the energy of the scan signals 411 and 412 transmitted by the transmitter 410. The fingerprint sensor 400 receives input of the fingerprint from the user by sensing a capacitance change in the electric field generated by the scan signals 411 and 412. The capacitance change in the electric field generated by the scan signals 411 and 412 may be input to the receiver 420 as the detection signals 421 and 422. For instance, a circuit of the fingerprint recognition module, which includes the receiver 420, may sense a capacitance change at a location of a pixel by sensing a certain change in voltage or current in the circuit connected to that pixel, and thereby sense the presence of a ridge or valley of the user's finger currently located above that pixel. The receiver 420 senses a capacitance change varying with each of the ridges and valleys of the fingerprint. The signal strengths of the detection signals 421 and 422 are determined according to the capacitance change.

Referring to FIG. 4A, both the transmitter 410 and the receiver 420 contact the ridge of the finger. The transmitter 410 outputs signal energy of an electric signal, that is, a first scan signal 411, toward the ridge of the finger, and the receiver 420 receives a large portion of that signal energy as a first detection signal 421, which is the first scan signal 411 changed by the ridge. If an object that inputs a fingerprint to the fingerprint sensor 400 has a high dielectric constant, a transfer rate of the first detection signal 421 may increase; on the other hand, if the object has a low dielectric constant, the transfer rate of the first detection signal 421 may decrease. That is, the amount of a second detection signal 421 transferred to the receiver 420 may be proportional to the dielectric constant.

Referring to FIG. 4B, the receiver 420 does not contact the valley, from which it can be seen that a second output signal 420, which is a changed version of the second scan signal 421 output from the transmitter 410 by the valley, is hardly input to the receiver 420. In other words, a smaller portion of the signal energy is received, as compared to the case of the ridge in FIG. 4A. Although the receiver 420 may receive the second scan signal 412 directly output from the transmitter 410, the amount of the second detection signal 422 changed by the valley and input to the receiver 420 is very small.

Figures 5A, 5B:
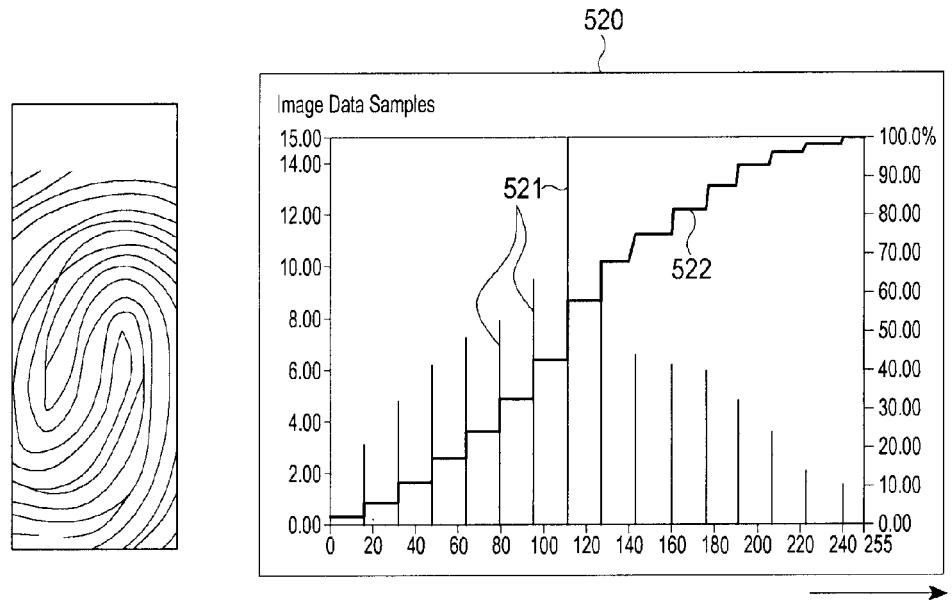
FIG. 5A and FIG. 5B illustrate an example in which an electronic device recognizes a fingerprint input from a user according to various embodiments of the present disclosure.

FIGS. 5A and 5B illustrate an example in which electronic device 101 recognizes a fingerprint input from a user according to various embodiments of the present disclosure. FIG. 5A illustrates a fingerprint image 510 of the fingerprint input from the user, and FIG. 5B illustrates a histogram type graph showing a signal-level-specific distribution for the fingerprint illustrated in FIG. 5A and an accumulation 522 of a number of data samples.

The fingerprint recognition module 180 may generate the fingerprint image 510 as illustrated in FIG. 5A based on the signal-level-specific data samples taken over respective pixels of the fingerprint scanner or the display 160. The graph 520 illustrated in FIG. 5B shows a signal-level-specific distribution.

More specifically, the abscissa of the graph in FIG. 5B represents specific levels (signal strengths) of the detection signals, classified such as in the 16-level example presented earlier. For instance, for any detection signal, which is a data sample of the user's finger at a specific location, a first specific level may be determined for a signal strength in the range of 1-15, a second level may be determined for signal strength in the range of 16-30, etc., and a $16^{th}$ level may be determined for signal strength in the range of 226-240. The left side ordinate in the graph, which corresponds to the vertical spikes 521 in the graph, represents a normalized number of image data samples, as a function of signal level. For instance, it is seen that a signal level range that most detection signals samples fall within, is approximately 110 (corresponding to 15 image data samples), while the smallest number of samples (about 2 samples) occurs at the $16^{th}$ level corresponding to signal strength value 240. Each spike 521 at a specific signal level of the abscissa has a height proportional to the number of detection signals that have a measured signal strength equaling that signal level (within a range as discussed above).

The right side ordinate in the graph, corresponding to the step pattern 522, represents an "accumulation" parameter, expressed as a percentage from 0 to 100%, and is determined by counting and accumulating samples for each signal level, from the lowest signal level (15) to the highest (240). The height of the accumulation step pattern is raised from left to right, with the height being discretely raised at each specific signal level on the abscissa proportional to the number of image data samples coinciding with that signal level. Thus, it is seen in the example that the accumulation pattern exhibits the largest change in accumulation (largest height increase) at a signal strength of approximately 110, which is the strength level coinciding with a range within which the most detection signal samples fall.

It is assumed that the data as represented by FIG. 5B represents a reference distribution for a particular user, and the data is suitably stored in memory 130 of electronic device 101.

Figure 6:
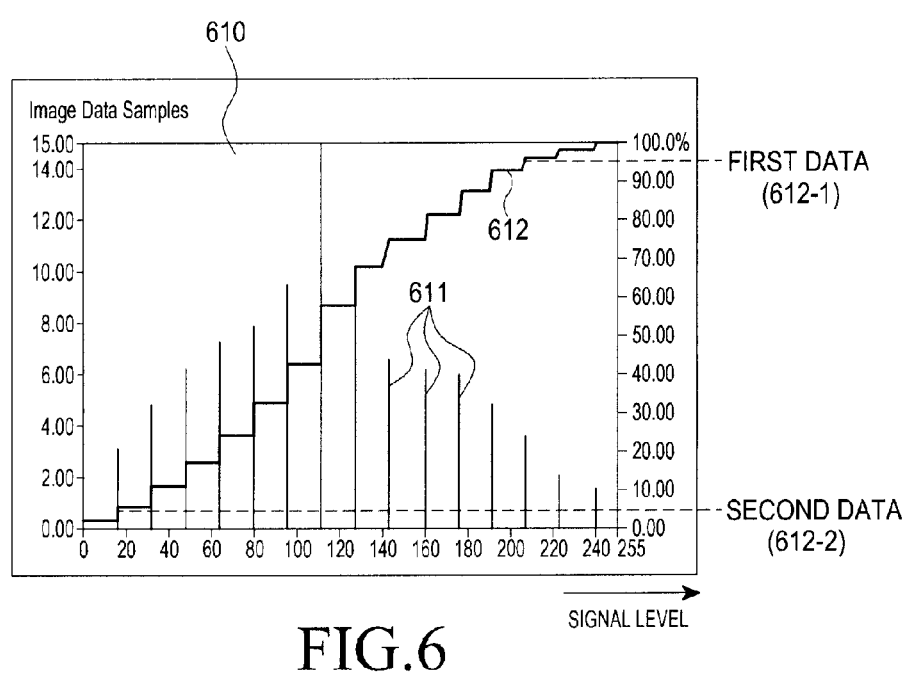
FIG. 6 and FIG. 7 are graphs illustrating the distribution of signal levels of a fingerprint input from a user to an electronic device and accumulation of the distribution according to various embodiments of the present disclosure.
Figure 7:
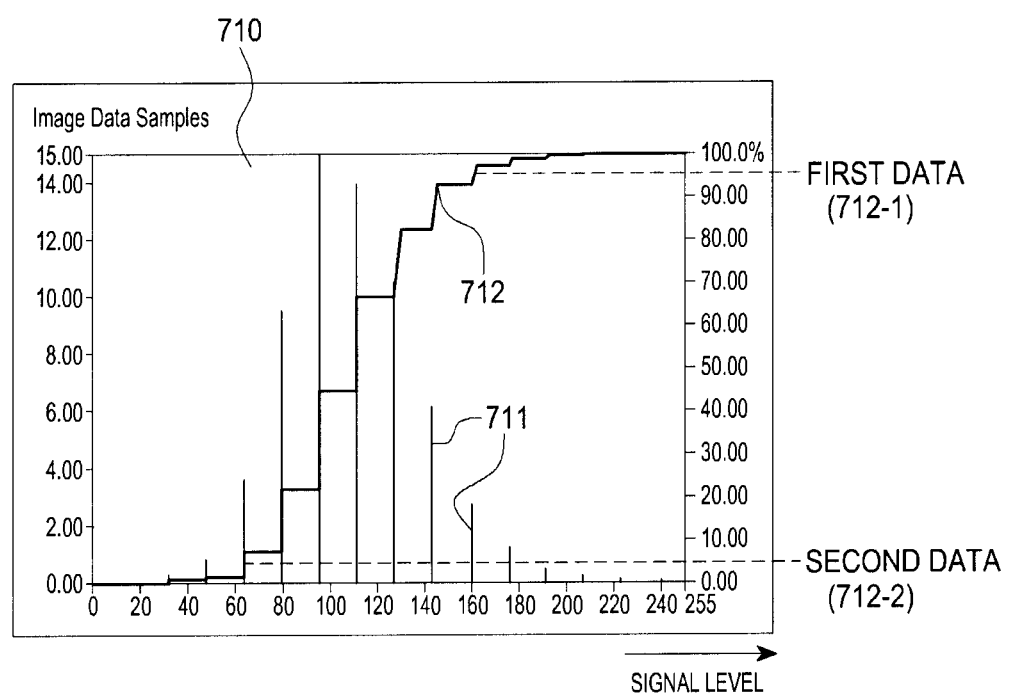

FIGS. 6 and 7 illustrate graphs showing a signal-level-specific distribution for a fingerprint input from a user to electronic device 101 and an accumulation pattern of the distribution according to various embodiments of the present disclosure. The graphs of FIGS. 6 and 7 are assumed to be based on the same parameters as in FIG. 5B.

A graph 610 of FIG. 6 shows a signal-level-specific distribution, represented by vertical spikes 611, for a valid fingerprint (with validity being based on the processor 120 determination as explained below). The distribution may be, for example, that of a non-forged fingerprint. An accumulation pattern 612 of the distribution may be generated in the same manner as that described for FIG. 5B. Each spike 611 at a specific signal level of the abscissa has a height proportional to the number of detection signals that have a measured signal strength equaling that signal level (within a range as discussed earlier). The accumulation pattern 612 is generated by accumulating the number of detection signal samples (image data samples) from the lowest signal level to the highest.

FIG. 7 shows a signal-level-specific distribution represented by data sample counts 711, for an invalid fingerprint, for example, a forged fingerprint, and an accumulation pattern 712 based on of the data sample counts 711. The fingerprint recognition module 180 may calculate the accumulation pattern 712 by using the signal-level-specific data sample counts 711, each coinciding with the number of detection signals having measured signal strength at the corresponding signal level.

The processor 120 determines a "determination value" for determining whether the fingerprint input from the user is forged by using the accumulation patterns 612 and 712 illustrated in FIGS. 6 and 7, respectively. The determination value may be a measure of a degree of distribution of the detection signals about a mean, according to signal strengths. In other words, the determination value may represent how the measured data sample counts for the detection signals at the respective signal levels, e.g. 521, 611, 711, are spread out as a function of signal level. If the distribution is close to the distribution of the stored reference fingerprint for that user, the current fingerprint input may be determined as valid. According to an example, the processor 120 may determine first data 612-1 and 712-1 which correspond to upper 5% values of the accumulation patterns 612 and 712, respectively, and second data 612-2 and 712-2 which correspond to lower 5% values of the accumulation patterns 612 and 712, respectively. The processor 120 may determine differences between the first data 612-1 and 712-1 and the second data 612-2 and 712-2 as the "determination values".

The processor 120 determines whether a fingerprint corresponding to each of the graphs 610 and 710 is forged, by determining whether the determination value falls within a preset range. In FIG. 6, a 95% accumulation level coincides with a signal level of approximately 205, and a 5% accumulation level coincides with a signal level of approximately 15. Thus, a difference between the first data 612-1 and the second data 612-2 is about 190 in FIG. 6. However, a difference between the first data 712-1 and the second data 712-2 is about 100 in FIG. 7 (indicating that the detection signal samples are more highly concentrated about the mean in FIG. 7 as compared to the reference distribution of FIG. 5B). Assuming that the preset range is 150-200, the processor 120 may determine that the fingerprint corresponding to the graph 610 of FIG. 6 is not forged, and that the fingerprint corresponding to the graph 710 of FIG. 7 is forged.

According to an embodiment of the present disclosure, the processor 120 may calculate an average and a standard deviation of signal strengths of detection signals by using the signal-level-specific distributions 611 and 711.

Figure 8:
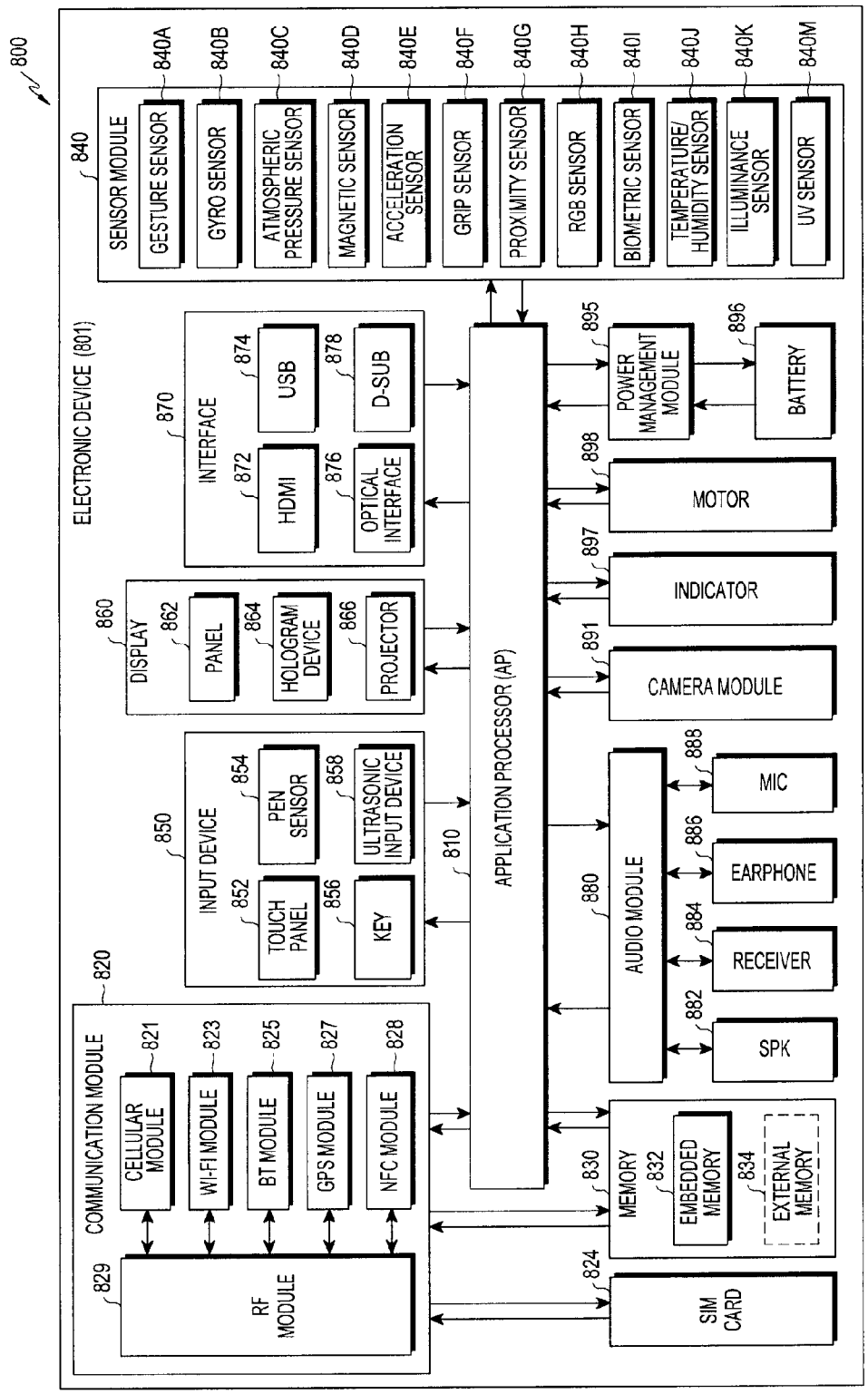
FIG. 8 is a block diagram of an electronic device according to various embodiments of the present disclosure.

FIG. 8 is a block diagram 800 of an electronic device 801 according to various embodiments of the present disclosure.

The electronic device 801 may include a whole or a part of, for example, the electronic device 101 illustrated in FIG. 1. The electronic device 801 may include one or more Application Processors (APs) 810, a communication module 820, a Subscriber Identification Module (SIM) card 824, a memory 830, a sensor module 840, an input device 850, a display 860, an interface 870, an audio module 880, a camera module 891, a power management module 895, a battery 896, an indicator 897, and a motor 898.

The AP 810 controls multiple hardware or software elements connected to the AP 810 or performs various data processing or operations, for example, by driving an OS or an application program. The AP 810 may be implemented, for example, with a System on Chip (SoC). According to an embodiment of the present disclosure, the AP 810 may further include a Graphic Processing Unit (GPU) and/or an Image Signal Processor (ISP). The AP 810 may include at least some (for example, a cellular module 221) of the elements illustrated in FIG. 8. The AP 810 loads a command or data received from at least one of other elements (for example, a nonvolatile memory) into a volatile memory to process the command or data, and stores various data in the nonvolatile memory.

The communication module 820 may have a configuration that is the same as or similar to that of the communication interface 170 of FIG. 1. The communication module 820 may include, for example, the cellular module 821, a Wireless Fidelity (Wi-Fi) module 823, a Bluetooth (BT) module 825, a Global Positioning System (GPS) module 827, a Near Field Communication (NFC) module 828, and a Radio Frequency (RF) module 829.

The cellular module 821 provides voice communication, video communication, a text service, or an Internet service over a communication network. According to one embodiment of the present disclosure, the cellular module 821 performs identification and authentication with respect to the electronic device 801 in a communication network by using a subscriber identification module (for example, the SIM card 824). According to an embodiment of the present disclosure, the cellular module 821 may perform at least some of functions that may be provided by the AP 810. According to an embodiment, the cellular module 821 may include a Communication Processor (CP).

Each of the Wi-Fi module 823, the BT module 825, the GPS module 827, and the NFC module 828 may include a processor for processing data transmitted and received therethrough. According to some embodiments, at least some (for example, two or more) of the cellular module 821, the Wi-Fi module 823, the BT module 825, the GPS module 827, and the NFC module 828 may be integrated into a single Integrated Chip (IC) or IC package.

The RF module 829 transmits and receives, for example, a communication signal (for example, an RF signal). The RF module 829 may include, for example, a transceiver, a Power Amp Module (PAM), a frequency filter, a Low Noise Amplifier (LNA), or an antenna. According to another embodiment of the present disclosure, at least one of the cellular module 821, the Wi-Fi module 823, the BT module 825, the GPS module 827, and the NFC module 828 transmits and receives an RF signal through the separate RF module 829.

The SIM card 824 may include, for example, a card including an SIM and/or an embedded SIM, and may include unique identification information (for example, an Integrated Circuit Card Identifier (ICCID)) or subscriber information (for example, an International Mobile Subscriber Identity (IMSI)).

The memory 830 (for example, the memory 830) may include, for example, an embedded memory 832 or an external memory 834. The embedded memory 832 may include, for example, at least one of a volatile memory (for example, a Dynamic Random Access Memory (DRAM) or Synchronous Dynamic RAM (SDRAM), a nonvolatile memory (for example, an One Time Programmable ROM (OTPROM), a Programmable ROM (PROM), an Erasable and Programmable ROM (EPROM), an Electrically Erasable and Programmable ROM (EEPROM), a mask ROM, a flash ROM, or a flash memory (such as a NAND flash or a NOR flash), a hard drive, and a Solid State Drive (SSD).

The external memory 834 may further include a flash drive, for example, a Compact Flash (CF), a Secure Digital (SD), a micro-Secure Digital (SD), a mini-SD, an Extreme Digital (xD), or a memory stick. The external memory 834 may be functionally and/or physically connected with the electronic device 801 through various interfaces.

The sensor module 840 measures a physical amount or senses an operation status of the electronic device 801 to convert the measured or sensed information into an electric signal. The sensor module 840 may include a fingerprint recognition module 180 (shown in FIG. 1) including a fingerprint sensor. The fingerprint sensor may be used to scan a user's fingerprint and determine whether a fingerprint is forged, in accordance with the methods described above. The sensor module 840 may include, for example, at least one of a gesture sensor 840A, a gyro sensor 840B, an atmospheric pressure sensor 840C, a magnetic sensor 840D, an acceleration sensor 840E, a grip sensor 840F, a proximity sensor 840G, a color sensor 840H (for example, a Red, Green, Blue (RGB) sensor), a biometric sensor 840I, a temperature/humidity sensor 840J, an illumination sensor 840K, and an Ultra Violet (UV) sensor 840M. Additionally or alternatively, the sensor module 840 may further include an E-nose sensor, an Electromyography (EMG) sensor, an ElectroEncephaloGram (EEG) sensor, an ElectroCardioGram (ECG) sensor, an Infrared (IR) sensor, and/or an iris sensor. The sensor module 840 may further include a control circuit for controlling at least one sensors included therein. In some embodiments, the electronic device 801 may further include a processor configured to control the sensor module 840 as a part of or separately from the AP 810, to control the sensor module 840 when the AP 810 is in a sleep status.

The input device 850 may include, for example, a touch panel 852, a (digital) pen sensor 854, a key 856, or an ultrasonic input device 2858. The touch panel 852 may use, for example, at least one of a capacitive type, a resistive type, an IR type, and an ultrasonic type. The touch panel 852 may further include a control circuit. The touch panel 852 may further include a tactile layer to provide tactile reaction to a user.

The (digital) pen sensor 854 may be, for example, a part of the touch panel 852 or a separate recognition sheet. The key 856 may include, for example, a physical button, an optical key, or a keypad. The ultrasonic input device 858 may sense audio waves and check data through a microphone (MIC) (for example, a MIC 888) in the electronic device 801 through an input means for generating an ultrasonic signal.

The display 860 may include a panel 862, a hologram device 864, or a projector 866. The panel 862 may have a configuration that is the same as or similar to that of the display 160 of FIG. 1. The panel 862 may be implemented as, for example, being flexible, transparent, or wearable. The panel 862 may be configured as a single module with the touch panel 852. The hologram device 864 shows a cubic image in the air by using interference of light. The projector 866 displays an image by projecting light onto a screen that may be positioned, for example, inside or outside the electronic device 801. According to an embodiment of the present disclosure, the display 860 may further include a control circuit for controlling the panel 862, the hologram device 864, or the projector 866.

The interface 870 may be, for example, a High-Definition Multimedia Interface (HDMI) 872, a Universal Serial Bus (USB) 874, an optical interface 876, or a D-subminiature (sub) 878. The interface 870 may be included in, for example, the communication interface 160 illustrated in FIG. 1. Additionally or alternatively, the interface 870 may include, for example, a Mobile High-Definition Link (MHL) interface, a Secure Digital (SD) card/Multi-Media Card (MMC) interface, or an Infrared Data Association (IrDA) standard interface.

The audio module 880 interchangeably converts sound and an electric signal. At least some components of the audio module 880 may be included in, for example, the I/O interface 140 illustrated in FIG. 1. The audio module 880 may process sound information that is input or output through the speaker 882, the receiver 884, the earphone 886, or the microphone 288.

The camera module 891 is a device capable of capturing a still image and a moving image, and according to an embodiment, may include one or more image sensors (for example, a front sensor or a rear sensor), a lens, an ISP, or a flash (for example, an LED or a xenon lamp).

The power management module 895 manages power of the electronic device 801. According to an embodiment, the power management module 895 may include a Power Management Integrated Circuit (PMIC), a charger IC, or a battery or fuel gauge. The PMIC may use a wired and/or wireless charging scheme. The wireless charging scheme may include, for example, a magnetic resonance scheme, a magnetic induction scheme, or an electromagnetic wave scheme, and an additional circuit for wireless charging, for example, a coil loop, a resonance circuit, or a rectifier may be further included. The battery gauge measures the remaining capacity of the battery 896, and a voltage, a current, or a temperature of the battery 896 during charging. The battery 896 may include, for example, a rechargeable battery and/or a solar battery.

The indicator 897 displays a specific status, such as a booting status, a message status, or a charging status, of the electronic device 801 or a part thereof (for example, the AP 810). The motor 898 converts an electric signal into mechanical vibration, and generates vibration or a haptic effect. Although not shown, a processing device (for example, a Graphic Processing Unit (GPU)) for supporting a mobile TV may be included. The processing device for supporting the mobile TV processes media data complying with the standard such as Digital Multimedia Broadcasting (DMB), Digital Video Broadcasting (DVB), or a media flow.

Each of the above-described elements of the electronic device 801 may include one or more components, and the name of the element may vary with a type of the electronic device 801. According to various embodiments, the electronic device 801 may include at least one of the above-described elements, and some elements may be omitted or other elements may be further included. Also, some of the elements of the electronic device 801 according to various embodiments of the present disclosure may be coupled into one entity to perform the same functions of the elements as those of the elements before coupled.

Figure 9:
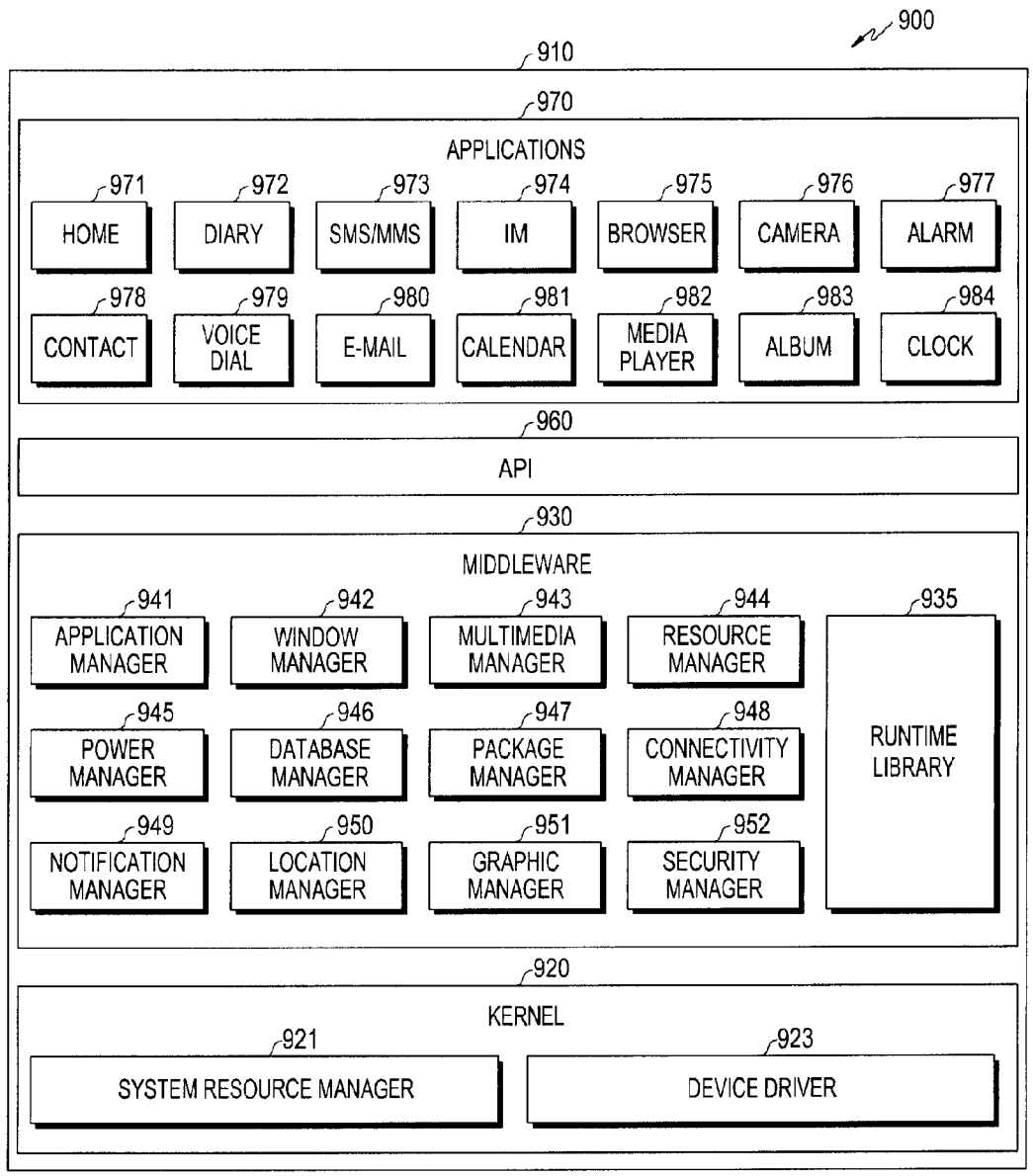
FIG. 9 is a block diagram of a program module according to various embodiments of the present disclosure.

FIG. 9 is a block diagram 900 of a program module 910 according to various embodiments of the present disclosure.

According to an embodiment of the present disclosure, the program module 910 (for example, the program 140) may include an OS for controlling resources related to an electronic device (for example, the electronic device 101) and/or various applications (for example, the application programs 147) driven on the OS. For example, the OS may be Android, iOS, Windows, Symbian, Tizen, Bada, or the like.

The program module 910 may include a kernel 920, middleware 930, an API 960, and/or applications 970. At least a part of the program module 910 may be preloaded on an electronic device or may be downloaded from a server (for example, the server 106).

The kernel 920 (for example, the kernel 141 of FIG. 1) may include a system resource manager 921 and/or a device driver 923. The system resource manager 921 controls, allocates, or collects system resources. The system resource manager 921 may include, for example, a process manager, a memory manager, and a file system manager. The device driver 923 may include, for example, a display driver, a camera driver, a Bluetooth driver, a shared memory driver, a USB driver, a keypad driver, a WiFi driver, an audio driver, or an Inter-Process Communication (IPC) driver.

The middleware 930 provides functions commonly necessary for the applications 970, or provides various functions to the applications 970 through the API 960 such that the applications 970 may efficiently use restricted system resources within the electronic device. According to an embodiment, the middleware 930 (for example, the middleware 143) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, and a security manager 952.

The runtime library 935 may include a library module that a compiler uses in order to add a new function through a programming language during execution of one of the applications 970. According to an embodiment, the runtime library 935 may perform an input/output, memory management, and/or a function for an arithmetic function.

The application manager 941 manages a life cycle of at least one of the applications 970. The window manager 942 manages Graphical User Interface (GUI) resources used by a screen. The multimedia manager 943 detects formats used for reproduction of various media files, and performs encoding and/or decoding of a media file by using a codec suitable for the corresponding format. The resource manager 944 manages resources such as a source code, a memory, and a storage space of at least one of the applications 970.

The power manager 945 manages a battery and/or power, while operating together with a Basic Input/Output System (BIOS), and provides power information used for operation. The database manager 946 manages generation, search, and/or change of a database to be used by at least one of the applications 970. The package manager 947 manages installation and/or an update of an application distributed in a form of a package file.

For example, the connectivity manager 348 manages wireless connectivity such as Wi-Fi or Bluetooth. The notification manager 949 displays and/or notifies an event, such as an arrival message, a promise, a proximity notification, and the like, in such a way not to disturb a user. The location manager 950 manages location information of an electronic device. The graphic manager 951 manages a graphic effect which will be provided to a user, and/or a user interface related to the graphic effect. The security manager 952 provides all security functions used for system security and/or user authentication. According to an embodiment, when an electronic device (for example, the electronic device 101), has a telephone call function, the middleware 930 may further include a telephony manager (not illustrated) for managing a voice and/or video communication function of the electronic device.

The middleware 930 may include a middleware module that forms a combination of various functions of the aforementioned elements. The middleware 930 provides modules specialized according to types of OSs in order to provide differentiated functions. Further, the middleware 930 dynamically removes some of the existing elements and/or adds new elements.

The API 960 (for example, the API 145) is a set of API programming functions, and may be provided with a different configuration according to the OS. For example, in a case of Android or iOS, one API set may be provided for each of platforms, and in a case of Tizen, two or more API sets may be provided for each platform.

The applications 970 (for example, the application program 147) may include, for example, a home application 971 a dialer application 972, a Short Messaging Service (SMS)/Multimedia Messaging Service (MMS) application 973, an Instant Messaging (IM) application 974, a browser application 975, a camera application 976, an alarm application 977, a contact application 978, a voice dial application 979, an email application 980, a calendar application 981, a media player application 982, an album application 983, a clock application 984, and one or more applications capable of providing a function such as health care (for example, measurement of an exercise volume or blood sugar) or providing of environment information (for example, atmospheric pressure, humidity, or temperature information).

According to an embodiment, the applications 970 may include an application for supporting information exchange between the electronic device (for example, the electronic device 101) and an external electronic device (for example, the electronic device 102 or 104), which will be referred to as an "information exchange application" for convenience. The information exchange application may include, for example, a notification relay application for relaying particular information to the external electronic device or a device management application for managing the external electronic device.

For example, the notification relay application relays notification information generated in the other applications (for example, the SMS/MMS application, the email application, the health care application, or the environment information application) of the electronic device to the external electronic device (for example, the electronic device 102 or 104). The notification relay application receives and provides the notification information from the external electronic device to the user. The device management application manages (for example, installs, deletes, or updates) at least one function (for example, power-on/power-off of the external electronic device (or some components) or display brightness (or resolution) control) of the external electronic device (for example, the electronic device 104) communicating with the electronic device, the application running on the external electronic device, or a service (for example, a call service or a messaging service) provided by the external electronic device.

According to an embodiment, the applications 970 may include an application (for example, a health care application) designated based on an attribute (for example, a mobile medical device as a type of the electronic device) of the external electronic device (for example, the electronic device 102 or 104). According to an embodiment, the applications 970 may include an application received from the external electronic device (for example, the server 106 or the electronic device 102 or 104). According to an embodiment, the applications 970 may include a preloaded application or a third party application that may be downloaded from a server. The names of the elements of the program module 910 according to the illustrated embodiment may vary with a type of an OS.

As is apparent from the foregoing description, a method and electronic device for authenticating a user through security-reinforced fingerprint recognition may be provided.

According to various embodiments, at least a part of the program module 910 may be implemented by software, firmware, hardware, or a combination of at least two of them. Further, at least a part of the program module 910 may be implemented by, for example, a processor (for example, the AP 810). At least a part of the program module 910 may include, for example, a module, a program, a routine, sets of instructions, and a process for performing one or more functions.

In according with an aspect, a non-transitory computer-readable recording medium storing instructions, that when executed by a processor, cause an electronic device to perform a method for authenticating a user using fingerprint recognition in an electronic device is provided. The method includes detecting a fingerprint input from the user by receiving detection signals for respective sample points across an area of the fingerprint input; computing a determination value representing a degree of distribution of the detection signals according to signal strengths; determining whether the determination value falls outside a preset reference range; and determining that the fingerprint input from the user is invalid, if the determination value falls outside the preset reference range.

The term "module" used in various embodiments of the present disclosure may refer to, for example, a "unit" including one of hardware, software, and firmware, or a combination of two or more thereof. The term "module" can be interchangeable with other terms such as unit, logic, logical block, component, or circuit. A "module" may be a minimum unit of integrally configured components or a part thereof. A "module" may be a minimum unit for performing one or more functions or a part thereof. A "module" may be mechanically or electronically implemented. For example, a "module" according to various embodiments of the present disclosure may include at least one of an Application-Specific Integrated Circuit (ASIC) chip, a Field-Programmable Gate Arrays (FPGAs), and a programmable-logic device for performing operations which has been known or will be developed in the future.

At least a part of a device (for example, modules or functions thereof) or a method (for example, operations) according to various embodiments of the present disclosure may be implemented by instructions stored in the form of program modules in computer-readable storage media. When the instruction is executed by a processor (for example, the processor 120), the one or more processors may perform a function corresponding to the instruction. The computer-readable storage medium may be, for example, the memory 130.

The computer readable recording media may include a magnetic media such as a hard disc, a floppy disc, and a magnetic tape, an optical recording media such as a Compact Disc Read Only Memory (CD-ROM) and a Digital Versatile Disc (DVD), a magneto-optical media such as a floptical disk, and a hardware device, such as a Read Only Memory (ROM), a Random Access Memory (RAM), and a flash memory, specifically configured to store and execute program instructions. In addition, the program instructions may include high class language codes, which may be executed in a computer by using an interpreter, as well as machine codes made by a compiler. The aforementioned hardware device may be configured to operate as one or more software modules in order to perform the operation of the present disclosure, and vice versa.

The module or program module according to various embodiments of the present disclosure may include at least one of the above-described elements, exclude some of them, or further include other elements. The operations performed by the module, the program module, or other elements according to various embodiments of the present disclosure may be executed in a sequential, parallel, repeated, or heuristic manner. Also, some operations may be executed based on a different order, may be omitted, or may additionally include another operation.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

What is claimed is:

1. A method for authenticating a user using fingerprint recognition in an electronic device, the method comprising:
   detecting, by a fingerprint sensor of the electronic device, a fingerprint input from the user by receiving detection signals for respective sample points across an area of the fingerprint input;
   determining, by a processor, a signal-level-specific distribution of signal strengths of detection signals corresponding to the fingerprint input;
   determining, by the processor, an accumulation pattern based on the signal-level-specific distribution;
   determining, by the processor, a determination value by using the accumulation pattern; and
   determining, by the processor, that the fingerprint input from the user is invalid, if the determination value falls outside a preset reference range.

2. The method of claim 1, wherein the preset range is based on a reference fingerprint image of the user.

3. The method of claim 1, wherein determining the signal-level-specific distribution of the signal strengths of the detection signals comprises:
   classifying, by the processor, each of a plurality of signal levels according to a respective range of the signal strengths of the detection signals corresponding to the fingerprint input; and
   determining, by the processor, a number of detection signals of the fingerprint input that correspond to each of the signal levels,
   wherein the accumulation pattern is determined based on the number of detection signals for each of the signal levels.

4. The method of claim 1, further comprising:
generating, by the fingerprint sensor, a fingerprint image by using the detection signals.

5. The method of claim 4, further comprising:
determining, by the processor, whether the generated fingerprint image matches a previously stored fingerprint image; and
determining, by the processor, that the fingerprint input is valid if the generated fingerprint image matches the previously stored fingerprint image and that the determination value falls within the preset reference range.

6. The method of claim 5, further comprising:
determining, by the processor, that the fingerprint input is invalid if the generated fingerprint image does not match the previously stored fingerprint image.

7. An electronic device for authenticating a user using fingerprint recognition, the electronic device comprising:
a fingerprint sensor configured to detect a fingerprint input from the user by receiving detection signals for respective sample points across an area of the fingerprint input; and
a processor configured to:
determine, a signal-level-specific distribution of signal strengths of detection signals corresponding to the fingerprint input,
determine an accumulation pattern based on the signal-level-specific distribution,
determine a determination value by using the accumulation pattern, and
determine that the fingerprint input from the user is invalid, if the determination value falls outside a preset reference range.

8. The electronic device of claim 7, wherein the preset range is based on a reference fingerprint image of the user.

9. The electronic device of claim 7, wherein the processor is configured to:
classify each of a plurality of signal levels according to a respective range of the signal strengths of the detection signals corresponding to the fingerprint input, and
determines a number of detection signals of the fingerprint input that correspond to each of the signal levels,
wherein the accumulation pattern is determined based on the number of detection signals for each of the signal levels.

10. The electronic device of claim 7, wherein the fingerprint sensor is further configured to generates a fingerprint image by using the detection signals.

11. The electronic device of claim 10, wherein the processor is configured to:
determines whether the generated fingerprint image matches a previously stored fingerprint image, and
determines that the fingerprint input is valid if the generated fingerprint image matches the previously stored fingerprint image and that the determination value falls within the preset reference range.

12. The electronic device of claim 11, wherein the processor is further configured to:
determine that the fingerprint input is not valid if the generated fingerprint image does not match the previously stored fingerprint image.

13. A non-transitory computer-readable recording medium storing instructions, that when executed by a processor, cause an electronic device to perform the method of claim 1.

14. The electronic device of claim 7, wherein the determination value is determined as a difference between a first signal level value corresponding to a first predetermined percentage of an accumulation of the distribution, which corresponds to a first point of the accumulation pattern, and a second signal level value corresponding to a second predetermined percentage of an accumulation of the distribution, which corresponds to a second point of the accumulation pattern.

15. An electronic device for authenticating a user using fingerprint recognition, the electronic device comprising:
a fingerprint sensor configured to detect a fingerprint input from the user by receiving detection signals for respective sample points across an area of the fingerprint input; and
a processor configured to:
compute a determination value representing a degree of distribution of the detection signals about a mean according to signal strengths,
determine whether the determination value falls outside a preset reference range with respect to the mean, and
determine that the fingerprint input from the user is invalid, if the determination value falls outside the preset reference range.

* * * * *